(12) United States Patent
Izu et al.

(10) Patent No.: US 8,846,785 B2
(45) Date of Patent: *Sep. 30, 2014

(54) MANUFACTURING METHOD OF CORE-SHELL-TYPE CERIA-POLYMER HYBRID NANOPARTICLES AND DISPERSION SOLS OF THEM

(75) Inventors: Noriya Izu, Aichi (JP); Ichiro Matsubara, Aichi (JP); Toshio Itoh, Aichi (JP); Woosuck Shin, Aichi (JP); Maiko Nishibori, Aichi (JP); Toshio Uchida, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 749 days.

This patent is subject to a terminal disclaimer.

(21) Appl. No.: 12/646,295

(22) Filed: Dec. 23, 2009

(65) Prior Publication Data

US 2010/0209710 A1 Aug. 19, 2010

(30) Foreign Application Priority Data

Dec. 26, 2008 (JP) ................................. 2008-335260

(51) Int. Cl.
*C08K 9/10* (2006.01)
*B82Y 30/00* (2011.01)
*C09C 1/00* (2006.01)
*C01F 17/00* (2006.01)

(52) U.S. Cl.
CPC . *C09C 1/00* (2013.01); *B82Y 30/00* (2013.01); *C01P 2004/62* (2013.01); *C01P 2006/10* (2013.01); *C01P 2004/64* (2013.01); *C01P 2006/12* (2013.01); *C01P 2004/52* (2013.01); *C01P 2004/84* (2013.01); *C01F 17/0043* (2013.01)
USPC ............. 523/210; 524/403; 424/59; 424/401; 428/407

(58) Field of Classification Search
USPC .................... 424/401, 59; 524/403; 428/407; 523/210
See application file for complete search history.

(56) References Cited

U.S. PATENT DOCUMENTS

| | | | |
|---|---|---|---|
| 4,116,908 A * | 9/1978 | Emery ........................ | 523/351 |
| 6,780,393 B2 | 8/2004 | Murayama et al. | |
| 2002/0119093 A1 | 8/2002 | Murayama et al. | |
| 2010/0015188 A1 * | 1/2010 | Izu et al. ....................... | 424/401 |
| 2010/0056361 A1 * | 3/2010 | Izu et al. ....................... | 502/159 |
| 2010/0330008 A1 * | 12/2010 | Izu et al. ........................ | 424/59 |
| 2011/0003156 A1 * | 1/2011 | Izu et al. ...................... | 428/407 |

FOREIGN PATENT DOCUMENTS

| | | |
|---|---|---|
| JP | 2002-255515 | 9/2002 |
| JP | 2003-225900 | 12/2003 |
| JP | 2004-35632 | 2/2004 |
| JP | 2008-115370 | 5/2008 |

OTHER PUBLICATIONS

Machine Translation of JP 2003225900 (Dec. 8, 2003).*
U.S. Appl. No. 12/444,508, filed Apr. 6, 2009.
U.S. Appl. No. 12/444,799, filed Apr. 8, 2009.
Shuichi Shibata, Seramikkusu, vol. 41, 2006, Bulletin of the Ceramic Society of Japan.
M. G. Krishna et al., "Temperature and ionic size dependence of the properties of ceria based optionic thin films", Materials Science and Engineering B55, 1998, pp. 14-20.
Mogensen et al., "Physical, chemical and electrochemical properties of pure and doped ceria", Solid State Ionics, 129, 2000, pp. 63-94.
Ho et al., Morphology-Controllable Synthesis of Mesoporous $CeO_2$ Nano- and Microstructures, Chem. Mater, 2005, 17, pp. 4514-4522.
Uekawa et al., "Characterization of $CeO_2$ fine particles prepared by the homogeneous precipitation method with a mixed solution of ethylene glycol and polyethylene glycol", J. mater. Res., vol. 19, No. 4, Apr. 2004, pp. 1087-1092.
Chu et al., "Sintering of Sol-Gel-prepared Submicrometer Particles Studied by Transmission Electron Microscopy", J. Am. Ceram. Soc., 76[8], 1993, pp. 2115-2118.
Hsu et al., "Preparation and Properties of Monodispersed Colloidal Particles of Lanthanide Compounds. 2. Cerium(IV)", Langmuir, 1988, vol. 4, pp. 31-37.

* cited by examiner

*Primary Examiner* — Hannah Pak
(74) *Attorney, Agent, or Firm* — Suzannah K. Sundby, Esq.; Canady + Lortz LLP

(57) ABSTRACT

The invention provides a method for manufacturing spherical, monodispersed core-shell type ceria-polymer hybrid nanoparticles including, a mixing step in which a cerium salt and a polymer are mixed together in a high-boiling-point organic solvent to obtain a mixture, and a heating and reflux step in which this mixture is heated and refluxed at a temperature of 110° C. or more to thereby generate a boiling phenomenon in the heating and reflux step, and rapidly cooling the mixture after the heating and reflux step to precipitate cerium oxide, and a liquid dispersion thereof.

14 Claims, 6 Drawing Sheets

MANUFACTURING METHOD OF CORE-SHELL-TYPE CERIA-POLYMER HYBRID NANOPARTICLES AND DISPERSION SOLS OF THEM

The present invention relates to a method for manufacturing ceria-polymer hybrid nanoparticles (micro-particles) or a dispersion sols containing such particles, and relates more particularly to a method for manufacturing spherical, monodispersed core-shell type cerium oxide-polymer hybrid nanoparticles including a mixing step in which a cerium salt and a polymer are mixed together in a high-boiling-point organic solvent to obtain a mixture and a heating and reflux step in which this mixture is heated and refluxed at a temperature of 110° C. or more to thereby generate a boiling phenomenon in the heating and reflux step, and rapidly cooling the mixture after the heating and reflux step to precipitate cerium oxide therefrom. The present invention provides a method for manufacturing core-shell type ceria-polymer hybrid nanoparticles and a liquid dispersion of such particles and also manufactured products that are applicable to catalysts, photonic crystals, gas sensors, chemomechanical polishing agents, ultraviolet shielding agents and the like.

Recently there has been interest in photonic crystals using fine particles (Non-patent Document 1). These are capable of artificially controlling light emission and light transmission by means of fine particles. The properties required of fine particles for use in photonic crystals are a spherical shape, a particle diameter of about 50 to 200 nm, a narrow particle size distribution (standard deviation of particle diameter), a high refractive index (n>2), and good dispersibility in liquid.

Nanoparticles fulfilling these conditions have not been previously reported. However, cerium oxide is a good material for photonic crystals, with a high refractive index of 2.1 (Non-patent Documents 2, 3).

Cerium oxide is also a well-known material as an ultraviolet shielding agent, and for example a prior document has disclosed an ultraviolet shielding agent using cerium oxide (Patent Document 1). Ultraviolet shielding agents are used in cosmetic products, where they come into contact with human skin. Therefore, the components thereof are preferably chemically inactive.

One way that has been reported for controlling the chemical activity of cerium oxide is to coat it in silica. Such cerium oxide fine particles that have been coated on the surface with a chemically inactive inorganic or organic substance are good candidates for ultraviolet shielding agents.

Synthesis of cerium oxide nanoparticles has been reported several times in the past (Non-patent Documents 4 to 7, Patent Document 2), but no descriptions can be found regarding dispersibility in water or variation in particle size of the fine particles. That is, there have been no reports of cerium oxide fine particles or a liquid dispersion of cerium oxide fine particles having a particle diameter of about 30 to 200 nm, a small particle size distribution (standard deviation of particle diameter), a spherical shape and good dispersibility in liquid.

When preparing a liquid dispersion of cerium oxide fine particles for the applications described above, a stable liquid dispersion cannot be obtained by the conventional method of simply dispersing dried cerium oxide fine particles in a dispersion solvent. This is because the cerium oxide fine particles aggregate, and it is necessary to break up these aggregations in order to obtain a stable dispersion.

Whether nanoparticles are synthesized by a gaseous phase process or a liquid phase process, they generally will aggregate strongly unless aggregation is controlled after the nanoparticles are produced. Once the nanoparticles have aggregated strongly, it is generally difficult to break up the aggregations even by suitable treatment of the particles.

A prior document discloses a technique of mechanically breaking up aggregations using ceramic beads (Patent Document 3), but the problem in this case is the possibility of contamination by impurities. A dispersion agent also must be added to the solvent. For these reasons, cerium oxide fine particles that are easy to disperse or in other words resistant to aggregation need to be synthesized in such a way that aggregations do not have to be broken up by mechanical means or by addition of a dispersion agent.

Since the nanoparticles are hard to separate once they have aggregated, it should be possible to obtain easily dispersible cerium oxide fine particles by treating them to control aggregation before they aggregate, or in other words as they are being produced.

If a dispersion solvent containing a dissolved polymer is used as the reaction site in this case, aggregation can be controlled as the cerium oxide fine particles are being produced, resulting in a stable liquid dispersion of cerium oxide fine particles. Even if the resulting liquid dispersion of cerium oxide fine particles is dried, moreover, it will probably be easy to re-disperse in a dispersion solvent because it has been subjected to aggregation control treatment.

A prior document (Patent Document 4) discloses the first example of such a concept applied to a reflux method for precipitating cerium oxide fine particles. The ceria-polymer hybrid nanoparticles obtained in this report are unlike other particles and have the following advantages.

That is, the advantages are that (1) the nanoparticles are spherical in shape, (2) the particle size distribution is small, (3) the particles have a core-shell structure comprising primary ceria particles 2 to 3 nm in diameter aggregated in spherical shape and coated on the outside with an organic polymer, (4) when dried, the nanoparticles are extremely easily to re-disperse in an aqueous or non-aqueous solvent, (5) it is possible to prepare a high-concentration liquid dispersion of the particles, and (6) the average particle diameter of these nanoparticles can be controlled within the range of 50 to 120 nm with a small particle size distribution by altering the molecular weight of the polymer added during preparation.

Patent Document 2 discloses a technique relating to a method for manufacturing cerium oxide fine particles, but includes no description of dispersibility in liquid or of variation in particle size of the fine particles. Patent Document 3 discloses a technique relating to a method of dispersing cerium oxide fine particle in liquid, but also includes no description of the shape of the dispersed cerium oxide fine particles or the particle size distribution. Patent Document 4 discloses a technique for core-shell type ceria-polymer hybrid nanoparticles, but the coefficient of variation as an indicator of re-dispersibility is in excess of 0.10 as shown from an SEM image.

[Patent Document 1] Japanese Patent Application Laid-open No. 2004-35632
[Patent Document 2] Japanese Patent Application Laid-open No. 2002-255515
[Patent Document 3] Japanese Patent Application Laid-open No. 2004-35632
[Patent Document 4] Japanese Patent Application Laid-open No. 2008-115370
[Non-patent Document 1] Shuichi Shibata, Ceramics, 41 (2006) 334
[Non-patent Document 2] M. G. Krishna, A. Hartridge, A. K. Bhattacharya, Materials Science and Engineering, B55 (1998) 14

[Non-patent Document 3] M. Mogensen, N. M. Sammes, G. A. Tompsett, Solid State Ionics, 129 (2000) 63

[Non-patent Document 4] C. Ho, J. C. Yu, T. Kwong, A. C. Mak, S. Lai, Chem. Mater., 17 (2005) 4514

[Non-patent Document 5] N. Uekawa, M. Ueta, Y. J. Wu, K. Kakegawa, J. Mater. Res., 19 (2004) 1087

[Non-patent Document 6] X. Chu, W. Chung, L. D. Schmidt, J. Am. Ceram. Soc., 76 (1993) 2115

[Non-patent Document 7] W. P. Hsu, L. Ronnquist, E. Matijevic, Langmuit, 4 (1988) 31

In order for spherical ceria-polymer hybrid nanoparticles to be applicable to colloidal crystals, it is necessary that the particle diameters be uniform. For this purpose, the coefficient of variation of particle diameter must normally be 0.10 or less. As discussed above, however, only those with a coefficient of variation in excess of 0.10 have so far been obtained. The coefficient of variation in this case means the average value of the particle diameters divided by the standard deviation in particle diameter. When particles have a uniform particle diameter, they are sometimes called monodispersed.

The nanoparticles previously reported have had a coefficient of variation of particle diameter of 0.10 or more, and it has not been possible to produce those with a coefficient below 0.10. In the present description, the coefficient of variation of particle diameter is obtained from the average particle diameter and standard deviation in particle diameter of numerous nanoparticles observed in a scanning electron microscope (SEM) image, transmission electron microscope (TEM) image or other electron microscope image. It is possible to determine the average particle diameter and standard deviation in particle diameter of particles in liquid by the dynamic light scattering method, but this method involves various assumptions. For this reason, the coefficient of variation as determined by dynamic light scattering is less reliable than the coefficient of variation as determined directly from an SEM image.

Under these circumstances, the inventors of this case have perfected the present invention after discovering as a result of exhaustive research aimed at developing a method for manufacturing ceria-polymer hybrid nanoparticles that would have a coefficient of variation in particle diameter of less than 0.10 that particles with a uniform particle diameter or in other words a coefficient of variation of particle diameter of less than 0.10 could be obtained by first producing ceria-polymer hybrid nanoparticle in a liquid in a boiling state, and then rapidly passing them through the temperature range at which boiling does not occur but particles grow rapidly during the cooling process.

It is an object of the present invention to provide a method for manufacturing ceria-polymer hybrid nanoparticles with a coefficient of variation of particle diameter of less than 0.10 as determined from an SEM image. It is also an object of the present invention to provide a method for manufacturing ceria-polymer hybrid nanoparticles having the aforementioned advantages (1) to (6), which are ceria-polymer hybrid nanoparticles with a coefficient of variation of particle diameter of less than 0.10, and a manufactured product.

To resolved the issues mentioned above, the present invention comprises the following technical means.

(1) A method for manufacturing spherical, monodispersed core-shell type ceria-polymer hybrid nanoparticles comprising:
mixing a cerium salt and a polymer in a high-boiling-point organic solvent to obtain a mixture (mixing step), heating and refluxing this mixture at a temperature of 110° C. or more (heating and reflux step) to thereby generate a boiling phenomenon during the heating and reflux step, and rapidly cooling (rapid cooling step) the mixture after the heating and reflux to precipitate cerium oxide therefrom.

(2) The method for manufacturing spherical, monodispersed core-shell type ceria-polymer hybrid nanoparticles according to (1) above, wherein ceria-polymer hybrid nanoparticles are produced in liquid that is boiling at 110° C. or more so as to put the particle diameters in order, and the liquid is then cooled in a rapid cooling step so that the liquid does not boil but can pass quickly through a growth temperature range of the particles to thereby obtain particles with uniform diameters.

(3) The method for manufacturing spherical, monodispersed core-shell type ceria-polymer hybrid nanoparticles according to (1) or (2) above, wherein the cooling rate down to 110° C. in the rapid cooling step is at least 0.5° C./sec.

(4) The method for manufacturing spherical, monodispersed core-shell type ceria-polymer hybrid nanoparticles according to any of (1) or (2) above, wherein the cerium salt is cerium nitrate, the polymer is polyvinyl pyrrolidone, and the high-boiling-point organic solvent is ethylene glycol.

(5) The method for manufacturing spherical, monodispersed core-shell type ceria-polymer hybrid nanoparticles according to any of (1) or (2) above, wherein water is added in the mixing step in order to produce a boiling phenomenon in the heating and reflux step.

(6) The method for manufacturing spherical, monodispersed core-shell type ceria-polymer hybrid nanoparticles according to any of (1) or (2) above, wherein the mixture is maintained at 150° C. or more in the heating and reflux step when the cerium salt is cerium nitrate hexahydrate in order to generate a boiling phenomenon in the heating and reflux step.

(7) A method for manufacturing a liquid dispersion of spherical, monodispersed core-shell type ceria-polymer hybrid nanoparticles, wherein spherical, monodispersed core-shell type ceria-polymer hybrid nanoparticles obtained by the manufacturing method defined in any of (1) to (6) are re-dispersed in an aqueous or non-aqueous solvent.

(8) Spherical, monodispersed core-shell type ceria-polymer hybrid nanoparticles having a structure composed of a core part comprising secondary particles of spherical aggregation of primary cerium oxide particles and a layer of polymer forming a shell part on the surface of the secondary particles, wherein
the coefficient of variation of diameter of the particles when dry is less than 0.10, the size of the secondary particles is 30 to 200 nm, the size of the primary particles is 1 to 10 nm, the percentage of shell part is 15 wt % to 25 wt %, the density is 4 to 5 g/cm$^3$ and the specific surface area is 10 to 200 m$^2$/g.

(9) The spherical, monodispersed core-shell type ceria-polymer hybrid nanoparticles according to (8) above, wherein the polymer is polyvinyl pyrrolidone (PVP), hydroxypropyl cellulose (HPC), hydroxypropyl methylcellulose or a related particle having a crosslinked structure thereof.

10. A ceria/resin composite comprising the spherical, monodispersed core-shell type ceria-polymer hybrid nanoparticles defined in (8) or (9) above dispersed in a resin.

Next, the present invention is explained in further detail.

In the present invention, a core-shell type ceria-polymer hybrid nanoparticle is defined as a core-shell type ceria-polymer hybrid nanoparticle having a core part composed of a secondary particle of spherical aggregation of primary particles of metal oxide, and a layer of polymer constituting the shell part which is present on the surface of this secondary particle.

In the present invention, the term "hybrid" means a composite, which is a composite of cerium oxide and a polymer. In the present description, the word hybrid is sometimes omitted, the term "fine particle" is sometimes used in place of "nanoparticle", and the polymer of the shell part is sometimes omitted in the description. That is, the particles are sometimes described as core-shell type ceria fine particles.

FIG. 1 shows a flow chart of the method of manufacturing spherical monodispersed core-shell type ceria-polymer hybrid nanoparticles of the present invention. First, a cerium salt, a polymer, and a high-boiling-point organic solvent are mixed as the raw materials. A cerium salt in this case is a metal salt in which the positive ions are cerium ions, and examples include cerium nitrate, cerium sulfate and cerium acetate. Cerium nitrate is preferred. The cerium salt is normally a hydrate. The concentration of the cerium salt is preferably 0.4 kmol/m$^3$ or more. This concentration serves to improve yield of the product.

The polymer is an organic polymer, and examples include polyvinyl pyrrolidone, hydroxypropyl cellulose, hydroxypropyl methylcellulose and the like. Polyvinyl pyrrolidone is preferred. The polymer concentration is preferably 80 kg/m$^3$ to 120 kg/m$^3$.

The polymer concentration here is defined in terms of the weight of polymer added per unit of solvent volume. The reason for a solvent concentration of 80 kg/m$^3$ to 120 kg/m$^3$ is that below this concentration the cerium oxide fine particle are more likely to aggregate, and are not of the core-shell type, and that the polymer concentration is above this range, the core formation reaction of cerium oxide will not progress.

A high-boiling-point solvent is one with a boiling point above 100° C., and is a polyol such as ethylene glycol, diethylene glycol, glycerin, propylene glycol or the like, and ethylene glycol is preferred.

In the step of mixing these raw ingredients, it is necessary that the ingredients be mixed thoroughly and uniformly. The temperature cannot be raised in this mixing step. In the case of high temperature, cerium oxide will be produced, and nanoparticles with a uniform particle diameter will not be obtained.

Uniform mixing is followed by heating and reflux at a specific temperature of 110° C. or more. This is a heating and reflux step accompanied by boiling. It is best if the temperature is raised as quickly as possible to a specific temperature from the temperature of the mixing step. Cerium oxide is produced during this heating and reflux step.

The primary particles of cerium oxide are a few nm in size, and these accumulate in spherical shapes to form secondary particles. These are the cores. As the secondary particles are being formed, the polymer collects on the surface of the secondary particles to form a shell. The polymer forming the shell may have the same structure as the polymer of the raw material, but crosslinking may also occur between polymers. The core is thus formed together with an inseparable shell.

Boiling is a technical aspect of the present invention that is indispensable during this heating and reflux step. As discussed above, this boiling state has the effect of producing uniform particle diameters, and without such boiling there is likely to be more variation in particle diameter.

The boiling is caused by water of crystallization contained in the cerium salt. Boiling can also be accomplished at a lower temperature, and this is achieved by adding water. Because being reflux, the weight of the water (including water of crystallization) and organic solvent are the same as during mixing. As a result, moreover, the temperature of the solution during boiling does not vary greatly. The temperature of the solution is also lower than the temperature of the heating medium. This means in other words that an endothermic reaction occurs during boiling due to vaporization heat.

The heating medium here is an aluminum block or oil in an oil bath or the like. The heating medium is heated by a heater, and although the medium has a high thermal capacity and is not likely to vary much from the set temperature, the temperature of the solution will often fall below the temperature of the heating medium because of an endothermic reaction due to vaporization heat.

Boiling can be confirmed visually, and can also be confirmed from the temperature of the heating medium. If the temperatures of the heating medium and solution are the same, there can be judged to be no boiling. If the temperature of the solution is lower than the temperature of the heating medium, there can be judged to be boiling.

When the cerium salt is cerium nitrate hexahydrate with a concentration of 0.6 kmol/m$^3$, the temperature at which boiling occurs is about 150° C. or more unless water is added. The boiling temperature can be lowered by adding water.

Heating and reflux of the solution are performed for a fixed time, and the solution is then cooled. Rapid cooling in this case is a second technical aspect of the present invention. This is because during slow cooling the particles grow because there is a temperature range at boiling does not occur and the particles can grow. The details of this process are described under Synthesis Example 1 below, but the main points are as follows.

When boiling occurs particle growth is suppressed, but it is believed that at the temperature range at which boiling does not occur this particle growth suppression effect disappears, and the particles start to grow.

The cooling speed down to 110° C. is preferably 0.5° C./s or more. Care does not need to be taken with the cooling speed at or below 110° C., because the particles do not grow at or below this temperature. A liquid dispersion containing spherical monodispersed core-shell type ceria-polymer hybrid nanoparticles is obtained in this way.

Because this liquid dispersion contains unreacted substances, these unreacted substances may need to be removed by separation and purification depending on the intended purpose. Methods of separation and purification include for example a method of precipitating the nanoparticles in a centrifuge, discarding the supernatant, re-dispersing them in any solvent, and then repeating the steps of separation and supernatant removal. According to the intended purpose they can be dispersed in any solvent to obtain a liquid dispersion of nanoparticles, or dried to obtain a nanoparticle powder.

In the present invention, ceria-polymer hybrid nanoparticles are produced in a liquid in a boiling state, and then cooled in a cooling step so that the temperature of the liquid passes rapidly to the temperature range at which there is no boiling and the particles grow rapidly, to thereby produce particles with a uniform diameter or in other words with a coefficient of variation of particle diameter of less than 0.10. The boiling is thought to have the effect of producing uniform particle diameters, and without boiling particle diameter is thought to vary. The use of this mechanism is the essence of the present invention.

Core-shell type ceria-polymer hybrid nanoparticles obtained in this way are core-shell type ceria-polymer hybrid nanoparticles each having a core part consisting of a secondary particle that is a spherical aggregation of primary particles of metal oxide, and a layer of polymer forming a shell part on the surface of this secondary particle, with the secondary particles having uniform particle diameters or in other words a coefficient of variation of particle diameter of less than 0.10.

In the present invention, the coefficient of variation is calculated from the particle diameters of numerous nanoparticles as measured under a scanning electron microscope, and is not determined by the dynamic light scattering method. The secondary particles are not porous, but are dense aggregations of primary particles. The size of the secondary particles is 30 to 200 nm, and the size of the primary particles is 1 to 10 nm.

The shell layer is composed of polyvinyl pyrrolidone (PVP), hydroxypropyl cellulose (HPC) or a related polymer having a crosslinked structure of these, and this layer does not separate from the secondary particle of the core part even under washing, and constitutes 15 wt % to 25 wt % of the whole. The shell layer preferably has a crosslinked structure.

The density of the core-shell type ceria-polymer hybrid nanoparticles is 4 to 5 g/cm$^3$. A nanoparticle powder has the property of dispersing favorably in a dispersion solvent with no added dispersion agent, does not precipitate even if left for a day or more in the dispersion solvent, and has good dispersibility even when subjected to heat treatment.

The specific surface area of the nanoparticle powder without heat treatment is 10 to 200 m$^2$/g or preferably 50 to 150 m$^2$/g. The specific surface area after 4 h heat treatment in air at 600° C. is 10 to 200 m$^2$/g or preferably 50 to 150 m$^2$/g. In terms of fields of Application of the present invention, the particles of uniform particle size of the present invention can be applied to catalysts, photonic crystals, gas sensors, chemomechanical polishers, ultraviolet shielding agent, inorganic particles in anti-reflecting films and the like.

The following effects are provided by the present invention.

(1) Particles of uniform particle diameter can be obtained by means of the present invention by first producing ceria-polymer hybrid nanoparticles in a liquid in a boiling state and then cooling them in a cooling step so that they pass rapidly to the temperature range at which boiling does not occur and the particle grow rapidly.

(2) Particles can be manufactured with a coefficient of variation of particle diameter of less than 0.10.

(3) Because they have a uniform particle diameter, spherical ceria-polymer hybrid nanoparticles obtained by the manufacturing method of the present invention can be applied to colloidal crystals for use in photonic crystal optical elements and the like.

(4) It is possible to provide cerium oxide fine particles or a liquid dispersion of cerium oxide fine particle with good dispersibility in liquid.

(5) It is possible to provide a cerium oxide/resin composite useful for ultraviolet shielding fibers or the like by dispersing the aforementioned ceria fine particles in resin.

(6) It is possible to provide a paste for preparing a porous thick film for a highly sensitive gas sensor.

(7) It is possible to provide a slurry for forming a catalyst with a large contact area with gas.

Next, the present invention is explained in detail based on examples, but the present invention is not in any way limited by these examples.

EXAMPLE 1

Polyvinyl pyrrolidone (PVP: Sigma Aldrich Japan K.K.) and cerium nitrate hexahydrate (Kojundo Chemical Laboratory) were added to ethylene glycol (EG: Wako Pure Chemical Industries) and agitated to completely dissolve them. The concentration of PVP was 120 kg/m$^3$, the concentration of cerium nitrate hexahydrate was 0.6 kmol/m$^3$, and the molecular weight of the PVP was 10,000 according to the catalog.

The EG with the dissolved PVP and cerium nitrate was heated and refluxed using a CC200 organic synthesizer (Shibata Scientific Technology). In this unit a flask is heated using an aluminum block, and the temperature of the aluminum block is the set temperature. A cooler for reflux purposes is located at the top of the flask.

Figure 1:
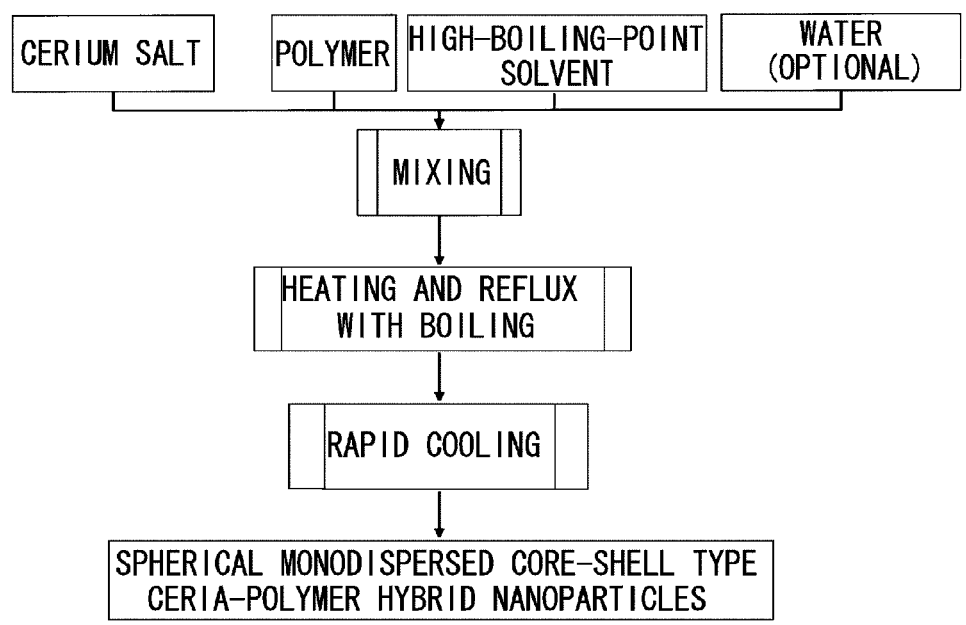
FIG. 1 shows a flow chart of the manufacturing method of the present invention.
Figure 2:
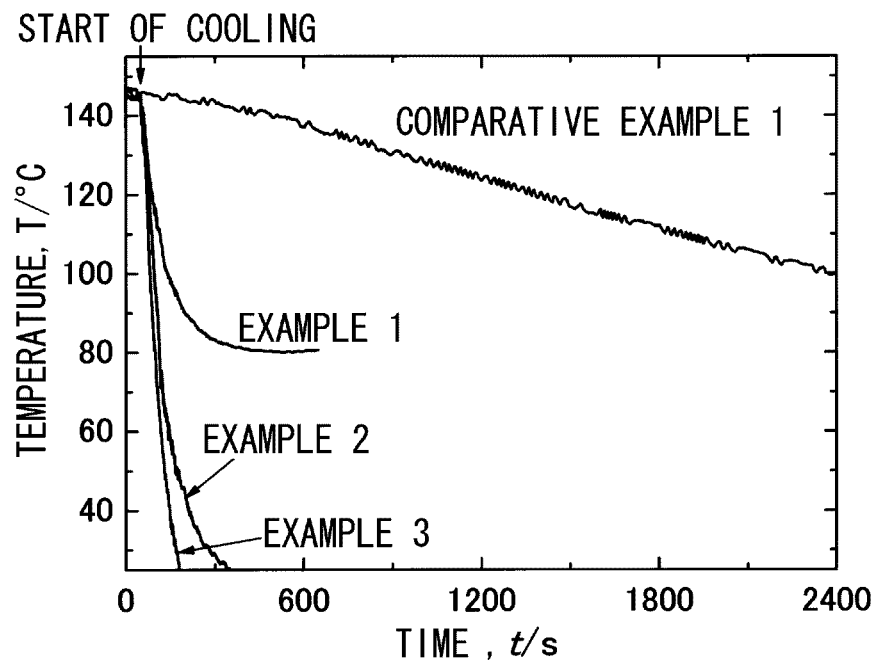
FIG. 2 shows changes in liquid temperature during cooling in Examples 1 to 3 and Comparative Example 1.

In Example 1, the set temperature of the aluminum block was 165° C., and the heating and reflux time after the arrival of the set temperature was 52 minutes. Although the set temperature of the aluminum block was 165° C., the actual liquid temperature was between 145 and 147° C. After the passage of a set period of time, the flask was removed from the organic synthesizer, and rapidly cooled by immersion in water at a liquid temperature of 80° C. The cooling curve in this case is shown in FIG. 2.

The average cooling speed down to 110° C. was 0.52° C./s. The flask was then cooled to room temperature by air cooling to obtain a liquid dispersion. The liquid and nanoparticles were then separated by centrifugation. At this time the particles were washed with water and ethanol in order to remove unreacted substances and excess polymer. Finally, the particles were dried at 80° C. to obtain a dried powder of nanoparticles.

Figure 3:
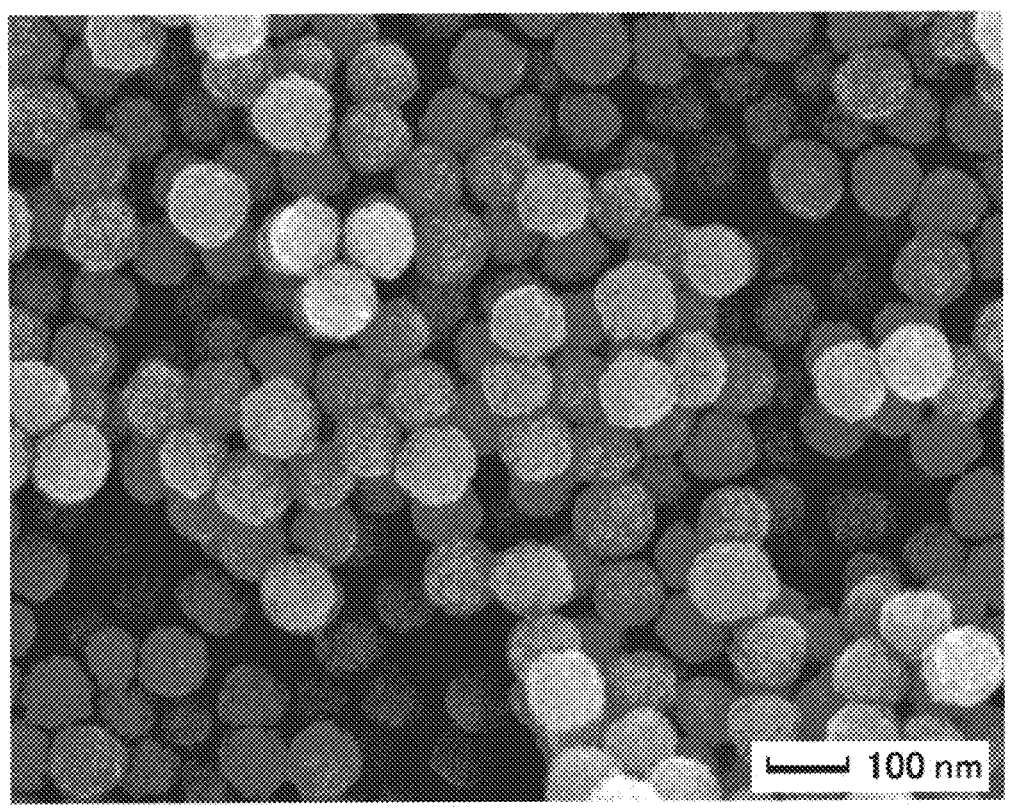
FIG. 3 shows an SEM image of the dry powder of Example 1.

A scanning electron microscope (SEM) image of the dried powder is shown in FIG. 3. Spherical monodispersed nanoparticles were observed. The thermogravimetric (TG) analysis results, infrared absorption (IR) spectrum and X-ray diffraction (XRD) pattern were as reported previously, confirming the existence of a core-shell structure. The average particle diameter of the core-shell nanoparticles as determined from the SEM image was 99.5 nm, with a coefficient of variance of 0.086.

EXAMPLE 2

A dried powder of nanoparticles was obtained by exactly the same methods as in Example 1 except for the cooling method. In Example 2, the temperature of the water for cooling was 20° C. The cooling curve in this case is shown in FIG. 2. The average cooling speed down to 110° C. was 0.92° C./s.

Figure 4:
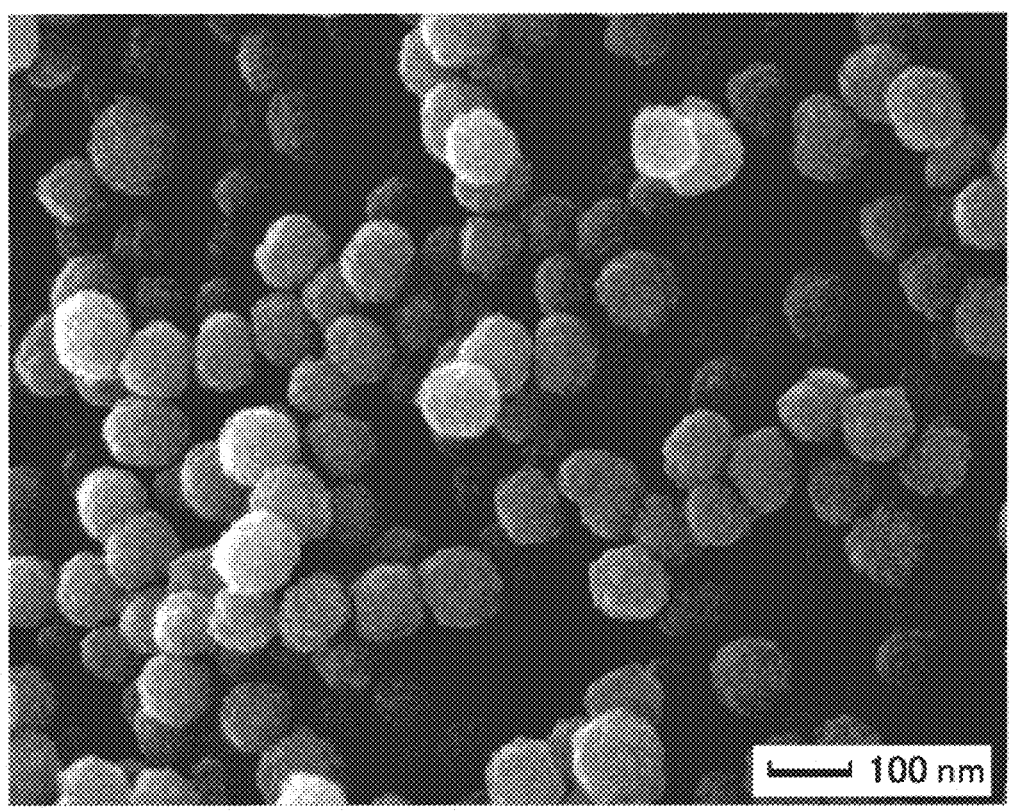
FIG. 4 shows an SEM image of the dry powder of Example 2.

An SEM image of the dried powder is shown in FIG. 4. Spherical monodispersed nanoparticles were observed. The thermogravimetric (TG) analysis results, infrared absorption (IR) spectrum and X-ray diffraction (XRD) pattern were as reported previously, confirming the existence of a core-shell structure. The average particle diameter of the core-shell nanoparticles as determined from the SEM image was 97.8 nm, with a coefficient of variance of 0.082.

EXAMPLE 3

A dried powder of nanoparticles was obtained by exactly the same methods as in Example 1 except for the cooling method. In Example 3, the liquid for cooling was a mixed solution of ethylene glycol and water, with a temperature of −12° C. The cooling curve in this case is shown in FIG. 2. The average cooling speed down to 110° C. was 1.35° C./s.

Figure 5:
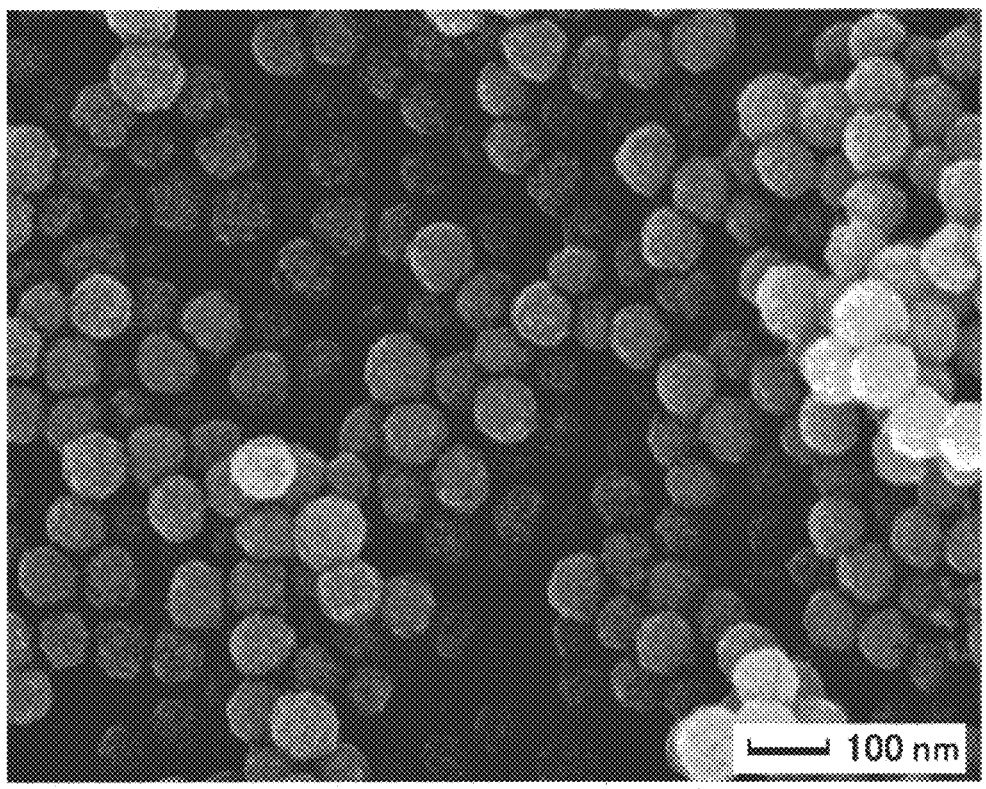
FIG. 5 shows an SEM image of the dry powder of Example 3.

An SEM image of the dried powder is shown in FIG. 5. Spherical monodispersed nanoparticles were observed. The thermogravimetric (TG) analysis results, infrared absorption (IR) spectrum and X-ray diffraction (XRD) pattern were as reported previously, confirming the existence of a core-shell structure. The average particle diameter of the core-shell nanoparticles as determined from the SEM image was 89.5 nm, with a coefficient of variance of 0.087.

COMPARATIVE EXAMPLE 1

A dried powder of nanoparticles was obtained by exactly the same methods as in Example 1 except for the cooling method. In Comparative Example 1, cooling was performed by natural cooling. The cooling curve in this case is shown in FIG. 2. The average cooling speed down to 110° C. was 0.02° C./s.

The SEM image, TG analysis results, IR spectrum and XRD pattern were as reported previously, confirming the existence of a core-shell structure. The average particle diameter of the core-shell nanoparticles as determined from the SEM image was 103.4 nm, with a coefficient of variance of 0.102.

EXAMPLES 4 TO 10

Dried powders of nanoparticles were obtained by exactly the same methods as in Example 1 except for the cooling method and reflux time. The cooling speed down to 110° C. was even faster than in Example 1, and the reflux time conditions were as shown in Table 1. The average coefficient of variance was 0.082.

COMPARATIVE EXAMPLES 2 AND 3

Dried powders of nanoparticles were obtained under the same conditions as in Comparative Example 1 except that the reflux times were as shown in Table 1. The average coefficient of variance was 0.104.

A statistically significant difference was found between Examples 1 to 10 on the one hand and Comparative Examples 1 to 3 on the other, showing that nanoparticles with a small coefficient of variance or in other words nanoparticles with uniform particle diameters can be obtained if the cooling speed down to 110° C. is 0.5° C./s or less.

TABLE 1

|  | Reflux time (min) | Average particle diameter (nm) | Coefficient of variance |
| --- | --- | --- | --- |
| Example 1 | 52 | 101.1 | 0.086 |
| Example 2 | 52 | 96.2 | 0.082 |
| Example 3 | 52 | 91.1 | 0.087 |
| Example 4 | 52 | 99 | 0.097 |
| Example 5 | 30 | 80.8 | 0.084 |
| Example 6 | 120 | 105.7 | 0.071 |
| Example 7 | 45 | 86.1 | 0.078 |
| Example 8 | 90 | 103.2 | 0.081 |
| Example 9 | 37 | 78.3 | 0.091 |
| Example 10 | 52 | 87.2 | 0.062 |
| Comparative Example 1 | 52 | 103.8 | 0.102 |
| Comparative Example 2 | 80 | 141.6 | 0.098 |
| Comparative Example 3 | 120 | 111.8 | 0.111 |

SYNTHESIS EXAMPLE 1

Figure 6:
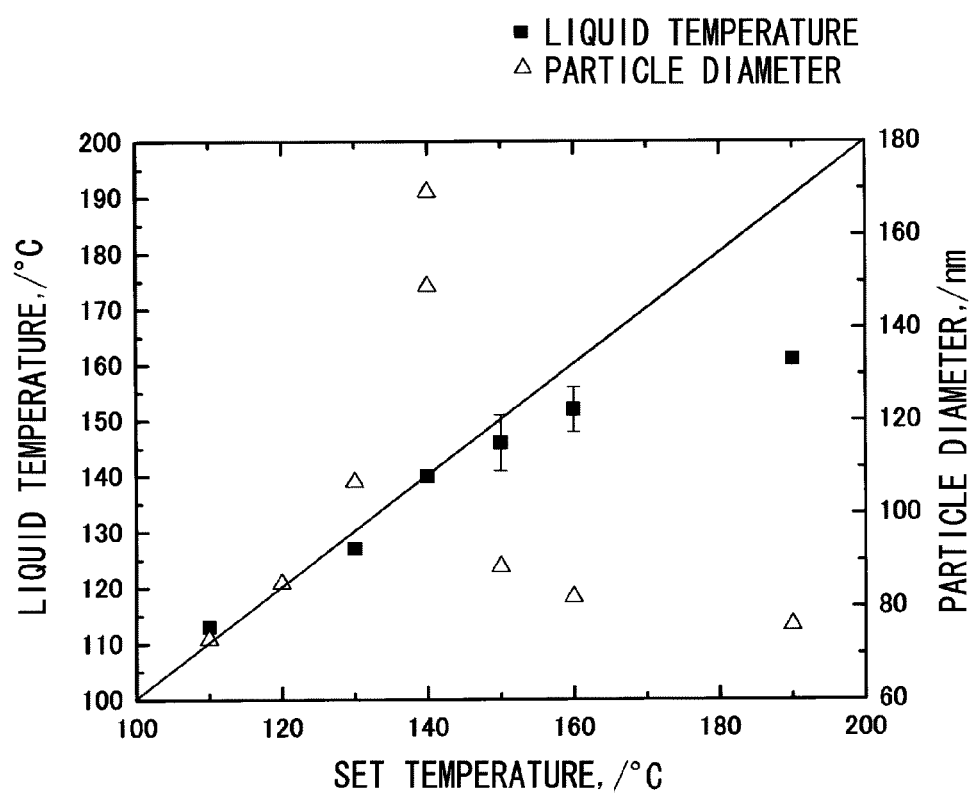
FIG. 6 shows the relationship between set temperature and actual liquid temperature for heating and reflux in the test of Synthesis Example 1, as well as the relationship between set temperature for heating and reflux and the particle diameter of the resulting core-shell type nanoparticles.

FIG. 6 shows the relationship between set temperature and actual liquid temperature during heating and reflux, and the relationship between set temperature during heating and reflux and the particle diameter of the resulting core-shell type nanoparticles. The test methods were roughly the same as in Example 2. The only differences are the set temperature and reflux time for heating and reflux. When the set time was different, the reflux time was also changed.

This is because the lower the temperature, the slower the reaction speed. Consequently, the reflux time was set so that the weight of the resulting core-shell type nanoparticles would be roughly the same. As discussed above, the set temperature is the temperature of the aluminum block used to heat the flask.

When the set temperature is less than 110° C., no nanoparticles were produced. When the set temperature was between 110° C. and 140° C., the set temperature and actual liquid temperature were roughly the same. At 150° C. and above, however, the actual liquid temperature was lower than the set temperature.

At 150° C. and above, a boiling phenomenon was observed in the liquid. Between 110° C. and 140° C., however, no boiling phenomenon was observed. Thus, the fact that the actual liquid temperature was lower than the set temperature at 150° C. and above was attributed to heat absorption due to boiling.

Regarding the relationship between set temperature and particle diameter of the core-shell nanoparticles, between 110° C. and 140° C. the particle diameter was greater the higher the set temperature, but at 150° C. it suddenly became smaller. Between 150° C. and 190° C., the particle diameter was roughly the same. Since the temperature at which the particle diameter suddenly shrank was the same as the temperature at which boiling starts, the following speculation is possible.

Up to 140° C. the particle diameter increases together with the set temperature, and this is believed to be because the particle growth speed increases because the actual liquid temperature increases. However, boiling causes an endothermic reaction which reduces the liquid temperature below the set temperature, and it is believed that this reduces the growth speed.

It is also believed that the particles cannot grow beyond a certain particle diameter due to the boiling phenomenon. The mechanism for this is not understood, but it is natural to assume from the results of FIG. 6 that boiling suppresses particle growth. In other words, it is believed that if boiling stops particle growth can no longer be suppressed.

Based on this, the following association can be made between cooling speed and coefficient of variation of particle diameter. During heating and reflux boiling occurs and particle growth stops at a particular particle diameter, or else the growth rate slows down, but when cooling starts and the actual liquid temperature falls below the boiling temperature, boiling stops. In the case of rapid cooling, the particle diameters do not change much because the temperature falls below 110° C. before particle growth can start.

In the case of natural cooling, however, because cooling is slow down to 110° C., there is enough time for the particles to grow, and particle growth starts. Because there is no particle growth suppression mechanism from boiling, some particles grow large, but particle growth is slower in places where there is less supply of cerium ions for particle growth, resulting in variation in particle diameter.

Thus, in order to obtain particles with uniform particle diameters it is necessary for the particles to pass rapidly to the temperature range at which boiling does not occur but particle growth is possible, and it has been shown in Synthesis Example 1 that a cooling rate in this case of faster than 0.5° C./s is adequate for this purpose.

EXAMPLE 11

A dried powder of nanoparticles was obtained by exactly the same methods as in Example 2 except that the set temperature for heating and reflux was 140° C., the time was 18.5 h, and 90 kg/m$^3$ of water was added. The liquid temperature without added water was 133° C., but fell to 125° C. after addition of water. This is attributed to the occurrence of a boiling phenomenon.

The SEM image, TG analysis results, IR spectrum and XRD pattern were as reported previously, confirming the existence of a core-shell structure. The average particle diameter of the core-shell nanoparticles as derived from the SEM image was 107.9 nm, with a coefficient of variance of 0.067. Thus, the coefficient of variance was small even when water was added to lower the boiling temperature.

As discussed above, the present invention relates to a method for manufacturing core-shell type ceria-polymer nanoparticles and a liquid dispersion thereof, and with the present invention it is possible to obtain particles with uniform particle diameters by first producing ceria-polymer hybrid nanoparticles in a liquid in a boiling state and then passing them rapidly through the temperature at which boiling does not occur but the particles grow rapidly in the cooling process, and to manufacture particles with a coefficient of variance of the particle diameter of less than 0.10. Because spherical ceria-polymer hybrid nanoparticles obtained by the manufacturing method of the present invention have uniform particle diameters, they can be applied to colloidal crystals, and it is possible to provide ceria fine particles or a liquid dispersion of ceria fine particles with good dispersibility in liquid. It is also possible to provide a ceria/resin composite consisting of ceria fine particles dispersed in resin.

The invention claimed is:

1. A method for manufacturing spherical, monodispersed core-shell type ceria-polymer hybrid nanoparticles having a coefficient of variation of diameter of less than 0.10 comprising:
   a mixing step which comprises mixing a cerium salt and a polymer in a high-boiling-point organic solvent to obtain a mixture,
   a heating and reflux step which comprises heating and refluxing the mixture at a temperature of 110° C. or more to thereby generate a boiling phenomenon, and a rapid cooling step which comprises rapidly cooling the mixture after the heating and reflux step,
   wherein the cooling rate down to 110° C. in the rapid cooling step is at least 0.5° C./sec, and
   wherein the cerium salt is cerium nitrate hydrate, the polymer is polyvinyl pyrrolidone, hydroxypropyl cellulose, or hydroxypropyl methylcellulose, and the high-boiling-point organic solvent is ethylene glycol, diethylene glycol glycelin, or propylene glycol, and
   wherein the spherical, monodispersed core-shell type ceria-polymer hybrid nanoparticles have structure composed of a core part comprising secondary particles of spherical aggregation of primary cerium oxide particles and a layer of polymer forming a shell part on the surface of the secondary particles, and the size of the secondary particles is 30-200 nm, the size of the primary particles is 1-10 nm, the percentage of shell part is 15-25% by weight, the density is 4-5 g/cm$^3$, and the specific surface area is 10-200 m$^2$/g.

2. A method for manufacturing the spherical, monodispersed core-shell type ceria-polymer hybrid nanoparticles according to claim 1, wherein the ceria-polymer hybrid nanoparticles are produced in liquid that is boiling at 110° C. or more so as to put the particle diameters in order,
   and then the hybrid nanoparticles are cooled by a rapid cooling step in which the condition of the cooling rate down to 110° C. in the rapid cooling step is at least 0.5° C./sec so that the liquid does not boil but can pass quickly through a growth temperature range of the particles to thereby precipitate cerium oxide therefrom and to obtain particles with uniform diameters.

3. The method for manufacturing spherical, monodispersed core-shell type ceria-polymer hybrid nanoparticles according to claim 1, wherein the polymer is polyvinyl pyrrolidone, and the high-boiling-point organic solvent is ethylene glycol.

4. The method for manufacturing spherical, monodispersed core-shell type ceria-polymer hybrid nanoparticles according to claim 1, wherein water is added in the mixing step in order to produce a boiling phenomenon in the heating and reflux step.

5. The method for manufacturing spherical, monodispersed core-shell type ceria-polymer hybrid nanoparticles according to claim 1, wherein the mixture is maintained at 150° C. or more in the heating and reflux step when the cerium salt is cerium nitrate hexahydrate in order to generate a boiling phenomenon in the heating and reflux step.

6. A method for manufacturing a liquid dispersion of spherical, monodispersed core-shell type ceria-polymer hybrid nanoparticles comprising,
   re-dispersing the spherical, monodispersed core-shell type ceria-polymer hybrid nanoparticles obtained by the manufacturing method defined in claim 1 in an aqueous or non-aqueous solvent.

7. Spherical, monodispersed core-shell type ceria-polymer hybrid nanoparticles having a structure composed of a core part comprising secondary particles of spherical aggregation of primary cerium oxide particles and a layer of polymer forming a shell part on the surface of the secondary particles, wherein
   said spherical, monodispersed core-shell type ceria-polymer hybrid nanoparticles are made according to the method of claim 1, and
   the coefficient of variation of diameter of the particles when dry is less than 0.10, the size of the secondary particles is 30 to 200 nm, the size of the primary particles is 1 to 10 nm, the percentage of shell part is 15 wt % to 25 wt %, the density is 4 to 5 g/cm$^3$ and the specific surface area is 10 to 200 m$^2$/g.

8. A ceria/resin composite comprising the spherical, monodispersed core-shell type ceria-polymer hybrid nanoparticles defined in claim 7 dispersed in a resin.

9. The method for manufacturing spherical, monodispersed core-shell type ceria-polymer hybrid nanoparticles according to claim 2, wherein the cerium salt is cerium nitrate, the polymer is polyvinyl pyrrolidone, and the high-boiling-point organic solvent is ethylene glycol.

10. The method for manufacturing spherical, monodispersed core-shell type ceria-polymer hybrid nanoparticles according to claim 2, wherein water is added in the mixing step in order to produce a boiling phenomenon in the heating and reflux step.

11. The method for manufacturing spherical, monodispersed core-shell type ceria-polymer hybrid nanoparticles according to claim 2, wherein the mixture is maintained at 150° C. or more in the heating and reflux step when the cerium salt is cerium nitrate hexahydrate in order to generate a boiling phenomenon in the heating and reflux step.

12. A method for manufacturing a cerium oxide/resin composite comprising:
dispersing the spherical, monodispersed core-shell type ceria-polymer hybrid nanoparticles obtained by the manufacturing method defined in claim 1 in resin.

13. Spherical, monodispersed core-shell type ceria-polymer hybrid nanoparticles having a structure composed of a core part comprising secondary particles of spherical aggregation of primary cerium oxide particles and a layer of polymer forming a shell part on the surface of the secondary particles, wherein
said spherical, monodispersed core-shell type ceria-polymer hybrid nanoparticles are made according to the method of claim 2, and
the coefficient of variation of diameter of the particles when dry is less than 0.10, the size of the secondary particles is 30 to 200 nm, the size of the primary particles is 1 to 10 nm, the percentage of shell part is 15 wt % to 25 wt %, the density is 4 to 5 $g/cm^3$ and the specific surface area is 10 to 200 $m^2/g$.

14. A ceria/resin composite comprising the spherical, monodispersed core-shell type ceria-polymer hybrid nanoparticles defined in claim 13 dispersed in a resin.

* * * * *